(12) United States Patent
Norito et al.

(10) Patent No.: US 11,186,332 B2
(45) Date of Patent: Nov. 30, 2021

(54) ELASTIC CRAWLER AND CRAWLER-TYPE TRAVEL DEVICE

(71) Applicant: FUKUYAMA RUBBER IND. CO., LTD., Hiroshima (JP)

(72) Inventors: Tatsuya Norito, Hiroshima (JP); Nao Fujiwara, Hiroshima (JP)

(73) Assignee: FUKUYAMA RUBBER IND. CO., LTD.

(*) Notice: Subject to any disclaimer, the term of this patent is extended or adjusted under 35 U.S.C. 154(b) by 233 days.

(21) Appl. No.: 16/328,803

(22) PCT Filed: Sep. 1, 2017

(86) PCT No.: PCT/JP2017/031529
§ 371 (c)(1),
(2) Date: Feb. 27, 2019

(87) PCT Pub. No.: WO2018/051808
PCT Pub. Date: Mar. 22, 2018

(65) Prior Publication Data
US 2019/0210671 A1 Jul. 11, 2019

(30) Foreign Application Priority Data
Sep. 14, 2016 (JP) .............................. JP2016-179771

(51) Int. Cl.
*B62D 55/253* (2006.01)
*B62D 55/24* (2006.01)
(Continued)

(52) U.S. Cl.
CPC ........... *B62D 55/253* (2013.01); *B62D 55/12* (2013.01); *B62D 55/244* (2013.01); *B62D 55/26* (2013.01)

(58) Field of Classification Search
CPC .... B62D 55/244; B62D 55/253; B62D 55/26; B62D 55/12
See application file for complete search history.

(56) References Cited

U.S. PATENT DOCUMENTS 5,131,731 A * 7/1992 Johnson ............... B62D 55/125
305/193
5,380,076 A * 1/1995 Hori ..................... B62D 55/202
305/171

(Continued)

FOREIGN PATENT DOCUMENTS

| JP | 504097 | 2/1975 |
|----|--------|--------|
| JP | 11222167 | 8/1999 |

(Continued)

*Primary Examiner* — S. Joseph Morano
*Assistant Examiner* — Emily G Castonguay
(74) *Attorney, Agent, or Firm* — Merek, Blackmon & Voorhees, LLC

(57) ABSTRACT

Provided are an elastic crawler and a crawler-type travel device in which wheel detachment and edge cut are unlikely to occur even when performing operations inside a large cylindrical structure or on a ground surface that is highly curved. An elastic crawler (1) has a crawler body (2) comprising an endless elastic body depressed by roller wheels having left and right tread surfaces, a plurality of lugs (4) being disposed on the ground-contact surface (7) of the crawler body (2). On one side portion in relation to the center position in the crawler width direction on the ground-contact surface side of the crawler body (2), outward of a tread surface (11c) which is the inner side of the roller wheels in the crawler width direction, toward the vicinity of one side end edge in the crawler width direction from a position within a range inward of a tread surface (11a) which is the outer side, a distance (dp) in the height direction of the tread surface (11a) which is the outer side is gradually reduced, whereby an inclined surface (7a) is formed such (Continued)

that the crawler thickness is gradually reduced, and due to this configuration, the inclined surface does not contact the ground when travelling on a flat surface.

4 Claims, 11 Drawing Sheets

(51) Int. Cl.
   *B62D 55/26* (2006.01)
   *B62D 55/12* (2006.01)

(56) References Cited

U.S. PATENT DOCUMENTS

| | | | | |
|---|---|---|---|---|
| 6,290,009 | B1 * | 9/2001 | Kondo | B62D 55/253 180/89.1 |
| 6,474,755 | B1 * | 11/2002 | Pringiers | B62D 55/244 305/170 |
| 6,568,769 | B1 * | 5/2003 | Watanabe | B62D 55/244 305/171 |
| 2004/0130212 | A1 * | 7/2004 | Ishibashi | B62D 55/244 305/169 |
| 2009/0090570 | A1 * | 4/2009 | Zuchoski | B62D 55/24 180/9.1 |
| 2010/0283317 | A1 * | 11/2010 | Soucy | B62D 55/244 305/175 |
| 2011/0209930 | A1 | 9/2011 | Brazler | |
| 2014/0031977 | A1 * | 1/2014 | Goldenberg | B25J 5/005 700/245 |
| 2016/0368551 | A1 * | 12/2016 | Stojic | B62D 55/26 |

FOREIGN PATENT DOCUMENTS

| | | | | |
|---|---|---|---|---|
| JP | | 2000302069 | | 10/2000 |
| JP | | 200340155 | | 2/2003 |
| JP | | 2003-252259 | | 9/2003 |
| JP | | 2010089644 | A * | 4/2010 ........ B62D 55/253 |

* cited by examiner

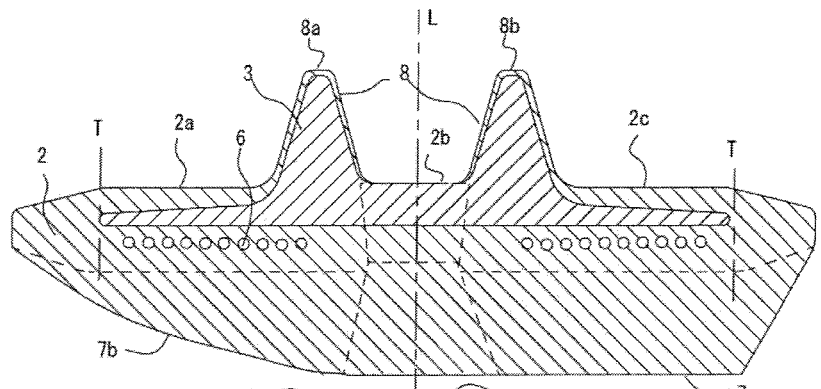

FIG. 3A (W-W Section)
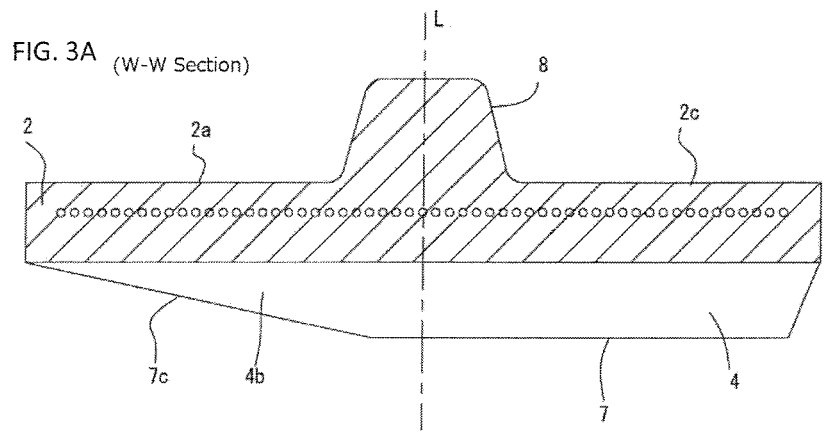
FIG. 3B
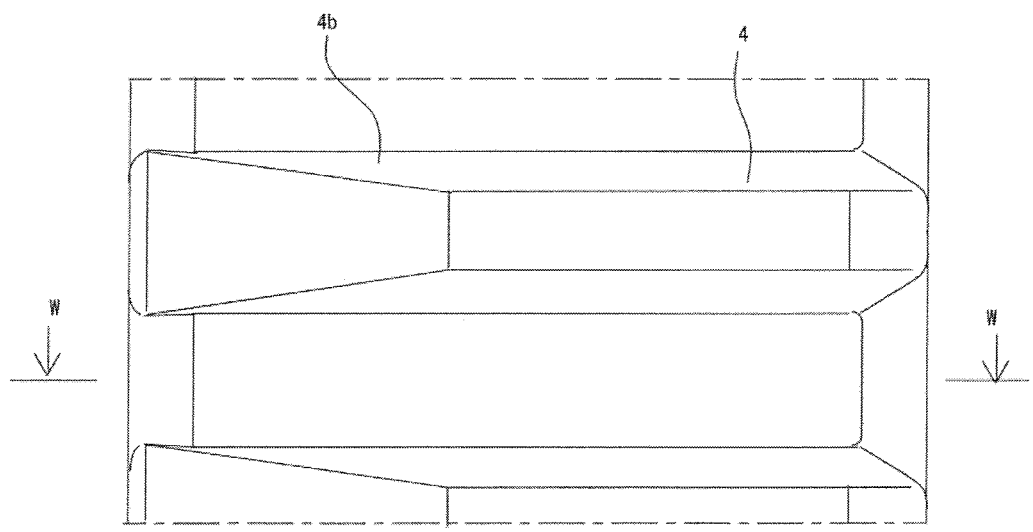

ELASTIC CRAWLER AND CRAWLER-TYPE TRAVEL DEVICE

TECHNICAL FIELD

The present invention relates to an elastic crawler and a crawler-type travel device.

TECHNICAL BACKGROUND

In order to ensure lateral stability of a crawler-type travel device, it is important to enlarge a gauge width. The gauge width is the length from one end of right elastic crawler to another end of left elastic crawler which are mounted on a piece of heavy equipment. The longer the gauge width of the crawler-type travel device is, the more lateral stability is increased. In a known elastic crawler as shown in Patent literature 1, as shown in FIG. 7, core metals are embedded at a predetermined spacing in a rubber crawler, and steal cords are embedded into the ground contact sides of the core metals as being separated in the width direction and as going around inside the crawler. Lugs are arranged in a zigzag right and left of the ground contact sides, and the right and left lugs provide with horizontal ground contact surfaces, respectively.

Besides, Patent literature 2 discloses an elastic crawler belt for uniformizing ground pressure distribution when a ground contact surface on a tread projection portion side is grounded to a horizontal surface by being pressed by virtue of pressing force of roller wheels, wherein the ground contact surface is formed so as to rise up at the time of no load.

BACKGROUND ART

Patent Literature

[Patent literature No. 1] Japanese Unexamined Patent Application Publication No. 11-222167
[Patent literature No. 2] Japanese Unexamined Patent Application Patent publication No. 2003-40155

SUMMARY OF THE INVENTION

Problems to be Solved by the Invention

Operations in a cylindrical structure or on a highly curved structure may cause industrial accidents because the footing condition of the operator is bad. The inventors have considered whether the crawler-type travel device can be used for the operations in these structures in order to secure the safety of the operator.

FIG. 5 shows a torpedo ladle TP, which is a concrete object of the type considered (which is used in iron factories and also called a torpedo car). The torpedo ladle TP is a specific freight car to carry pig iron (hot iron). A furnace body has a receiving/tapping throat EN in the center, and firebricks BL are lined on the inside thereof. The torpedo ladle is formed into a cylindrical structure whose size is restricted so as to travel on a rail track. The operations for decommissioning and carrying the interior firebricks BL inside the torpedo ladle TP have depended on human's hands. The present crawler-type travel devices are found to have a considerable problem in the application by examining whether the crawler-type travel device CM can be effectively used in these kinds of worksite.

FIG. 6 shows the pattern diagram of the vicinity of the bottom part of FIG. 5B. As shown in FIG. 7 of Patent literature 1, when operating on the curved bottom surface by using a crawler 100 with lugs arranged symmetrically in the crawler width direction, the body outside portion of the crawler-type travel device CM constantly receives an upward stress by contact with the cylindrical wall surface. Therefore, the stress acts on ends of the lugs in the crawler width direction (in the figure, a position as indicated by P) as shown in FIG. 8B, thereby causing edge cuts. Further, the elastic crawler itself also easily runs off.

In consideration of the above-mentioned actual situations, it is an object to provide an elastic crawler and a crawler-type travel device in which wheel detachment and edge cuts are unlikely to occur even when operating in a large cylindrical structure or on a highly curved ground surface.

Means to Solve the Problem

An elastic crawler relating to the first embodiment of the present invention has a crawler body made of an endless elastic body and a plurality of lugs. The crawler body is depressed by roller wheels having left and right tread surfaces, and the lugs are disposed on the ground contact surface of the crawler body. On one side portion in relation to the center position in the crawler width direction on the ground-contact surface side of the crawler body, outward of a tread surface which is the inner side of the roller wheels in the crawler width direction, toward the vicinity of one side end edge in the crawler width direction from a position within a range inward of a tread surface which is the outer side, a distance in the height direction of the tread surface which is the outer side is gradually reduced, whereby an inclined surface is formed such that the crawler thickness is gradually reduced, and due to this configuration, the inclined surface does not contact the ground when traveling on a flat surface.

According to the above-mentioned elastic crawler, the vehicle body outside crawler body of the travel device rarely receives an excessive stress from the cylindrical wall surface, thereby enabling a reduction in wheel detachment and edge cuts.

Besides, the elastic crawler related to the second embodiment of the invention is characterized in that the inclined surface formed on one side portion in relation to the center position in the crawler width direction of the crawler body is formed into a curved surface.

According to the above-mentioned elastic crawler, it is possible to more efficiently avoid the stress that the vehicle body outside the crawler body of the travel device receives from the cylindrical wall surface, to reduce wheel detachment and edge cut, thereby enabling to improve the strength of the crawler body.

Further, the crawler-type travel device of some embodiments of the invention is so mounted that the inclined surface formed on one side in relation to the center position in the crawler width direction of the crawler body is located outside the vehicle body.

According to the above-mentioned crawler-type travel device, it is possible to efficiently work in the cylindrical structure without causing wheel detachment and edge cut to the crawler.

Effects of the Invention

According to at least some embodiments of the invention, it is possible to provide an elastic crawler and a crawler-type travel device in which wheel detachment and edge cut are unlikely to occur even when performing operations in a large cylindrical structure or on a highly curved ground surface.

BRIEF DESCRIPTION OF THE DRAWINGS

FIG. 2A is a cross section in the crawler width direction related to the second embodiment of the invention, FIG. 2B and FIG. 2C are cross sections in the crawler width direction related to further versions of the second embodiment, and FIG. 2D is a partially plan view of the ground contact surface of the elastic crawler related to either of the further versions of the second embodiment.

FIG. 3A is a cross section in the crawler width direction related to the third embodiment of the invention taken along lines W-W in FIG. 3B, and FIG. 3B is a partially plan view of the ground contact surface.

PREFERRED EMBODIMENT OF THE INVENTION

The embodiments of the elastic crawler of the invention will be explained as follows with reference to figures.

Figure 5A:
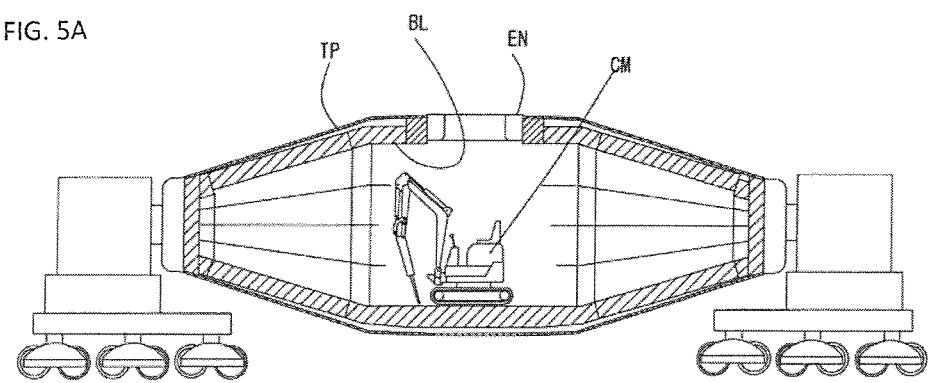
FIG. 5A is a longitudinal section showing from the side of the crawler-type travel device in operation inside the torpedo ladle.

FIG. 5A is a longitudinal section as seen from the side of the crawler-type travel device CM in operation in the torpedo ladle TP. The torpedo ladle TP is used by storing and transporting pig iron melted in an ironworks, being an iron structure having an around 3 m inner diameter. The longitudinal cross section is formed in a torpedo shape, and the transverse cross section is formed in a circle. The inner wall surface is covered all over with firebricks BL. When the firebricks BL deteriorate, the bricks must be carried out outside the vehicle body by breaking up the inner wall surface. However, on carrying out this operation with a crawler-type travel device of around 1.5 m vehicle height, working efficiency and safety turned out to be high.

Figure 5B:
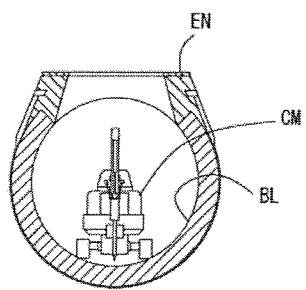
FIG. 5B is a transverse cross section.
Figure 6:
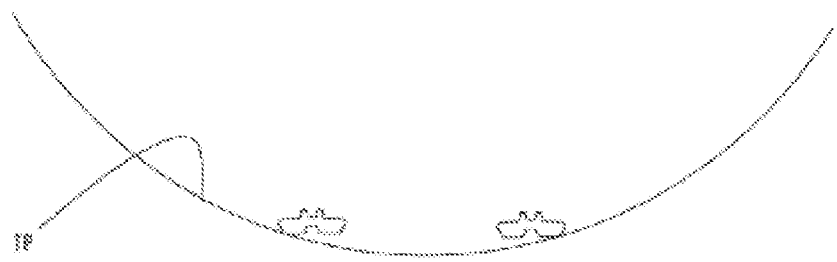
FIG. 6 is a typical view of FIG. 5B.
Figure 7:
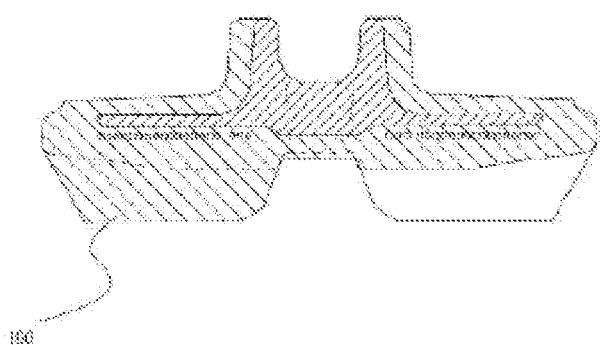
FIG. 7 shows an example of a conventional elastic crawler.
Figure 8A:
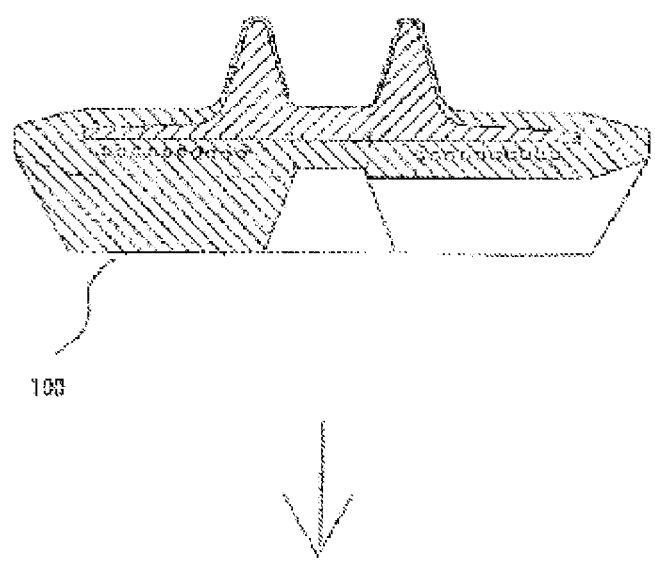
FIGS. 8A and 8B show an example of a damaging method of the elastic crawler when operating inside the torpedo ladle by using the conventional elastic crawler.
Figure 8B:
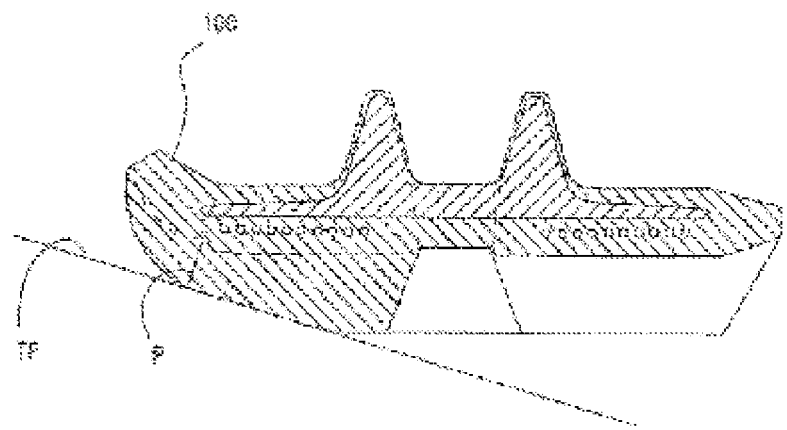

However, because the transverse cross section of the torpedo ladle TP is cylindrical as shown in FIG. 5B, the bottom surface where it comes into contact with the elastic crawler is curved. As shown in FIG. 6, because the outer portion of the vehicle body of the elastic crawler comes in contact with the cylindrical wall surface, it constantly receives an upward stress. In the conventional elastic crawler in which core metals are embedded as shown in FIG. 7, such a design creates problems, i.e., edge cuts are generated and wheel detachment is caused as shown in FIGS. 8A and 8B.

In an elastic crawler having no core metals (core metal-less crawler), similar problems occur because the elastic crawler receives shear force generated by being held between a corner portion of the outer end of a roller wheel and the cylindrical wall surface.

Figure 1A:
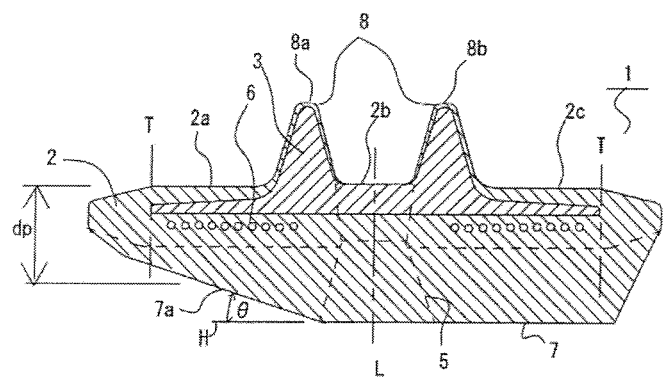
FIG. 1A is a cross section in the crawler width direction related to the first embodiment of the invention taken along lines X-X in FIGS. 1B and 1C.
Figure 1B:
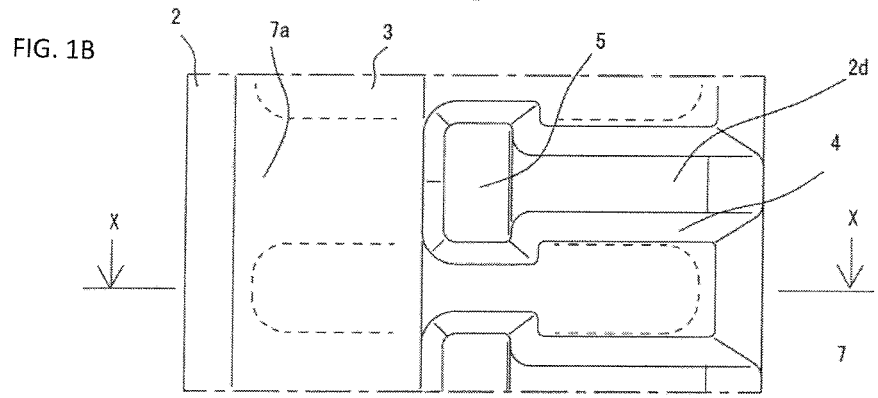
FIG. 1B is a partially plan view of the ground contact surface.
Figure 1C:
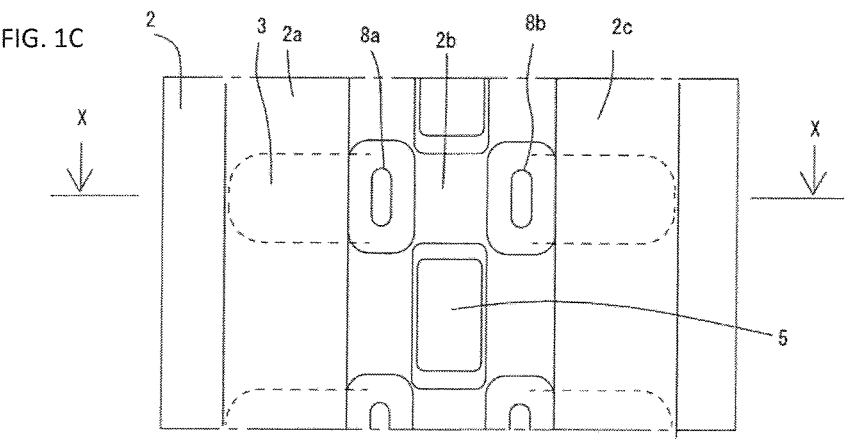
FIG. 1C is a partially plan view of the inner peripheral surface.

FIG. 1A is a cross section in the crawler width direction related to the first embodiment of the invention, FIG. 1B is a plan view of the ground-contact surface side, and FIG. 1C is a plan view of the inner peripheral surface side. An elastic crawler 1 of the first embodiment has core metals 3, a plurality of lugs 4 and steel cords 6 embedded in a crawler body 2 of an endless belt band which is formed from a rubber elastic body, etc. The core metals 3 are embedded at fixed intervals in a crawler circumferential direction. The lugs 4 are projected from the contact ground surface side of the elastic crawler 1. The steel cords 6 are embedded into the outer circumferential side of the core metals 3 in the crawler circumferential direction in a manner properly distributed to left and right of engagement holes 5 for engaging driving wheels of the travel device. Numerals 2a, 2b, and 2c are faces that can be depressed by tread surfaces of roller wheels of the crawler-type travel device. Depending on the shape of a roller wheel, the faces 2a and 2c are depressed by the tread surfaces or the face 2b is depressed by the tread surface. All of the faces 2a, 2b and 2c are formed in a horizontal surface. Besides, depending on the roller wheels, tops 8a and 8b of guide protrusions 8 are sometimes depressed by the tread surfaces. When being mounted on the crawler-type travel device, the face 2a and the top 8a are located outside, and the face 2c and the top 8b are located inside. An inclined surface 7a is formed on one side portion in relation to the center position L in the width direction of the crawler body 2, being inclined from the center position in the crawler width direction toward the vicinity of one side end edge in the crawler width direction. The inclined surface 7a gradually reduces the crawler thickness by gradually reducing a distance dp in the height direction between the face 2a and the top 8a. An inclination angle θ of the inclined surface 7a is 20 degree to a virtual horizontal surface H. Depending on the size of the torpedo ladle, the inclination angle θ can be changed in the range of 15 to 25 degrees, more preferably in the range of 17 to 21 degrees.

Besides, the outer sides than the faces 2a and 2c (outer sides than alternate long and short lines T in FIG. 1) form end edges by retreating the inclined surface 7a and the ground contact surface 7 on the upper side as being continued or not continued to the inclined surface 7a and the ground contact surface 7 in order to secure turning performance of the crawler-type travel device.

Figure 9A:
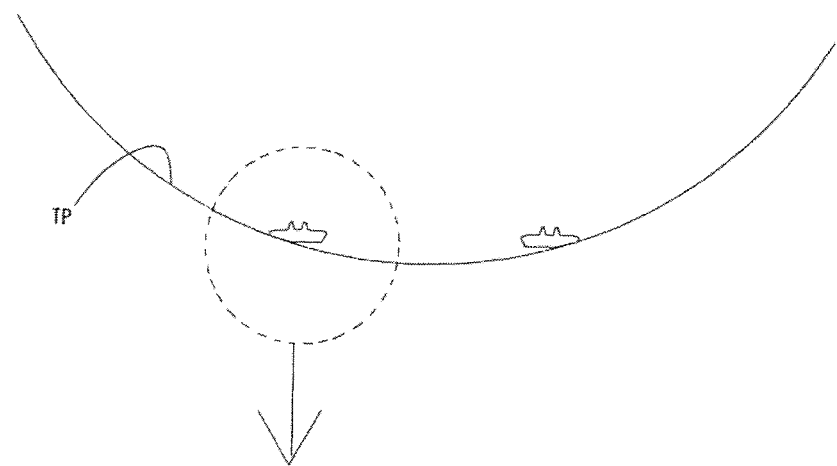
FIGS. 9A and 9B show the state of the elastic crawler when operating inside the torpedo ladle by using the elastic crawler related to the first embodiment of the invention.
Figure 9B:
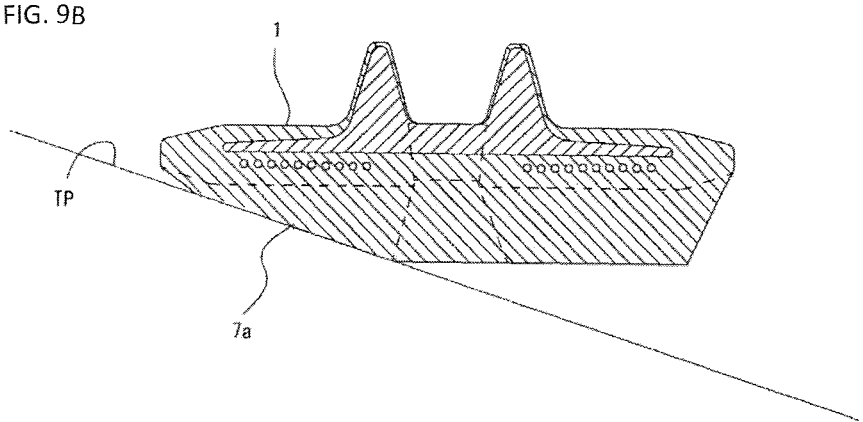

When using two elastic crawlers of the present embodiment inside the torpedo ladle by mounting on the crawler-type travel device so that the inclined surface formed on one side portion in relation to the center position in the crawler width direction of the crawler body is located outside the vehicle body, the crawler is in a state along the cylindrical wall surface as shown in FIG. 9. Therefore, the stress received from the wall surface is reduced, thereby enabling to efficiently prevent wheel detachment and the edge cut of the crawler.

Figure 5C:
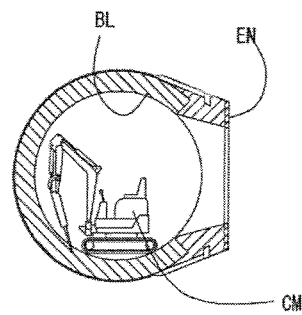
FIG. 5C is a view showing the state that the torpedo ladle is rotated.
Figure 5D:
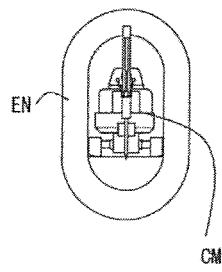
FIG. 5D is a view showing the state when the torpedo ladle entries and exits.
Figure 10:
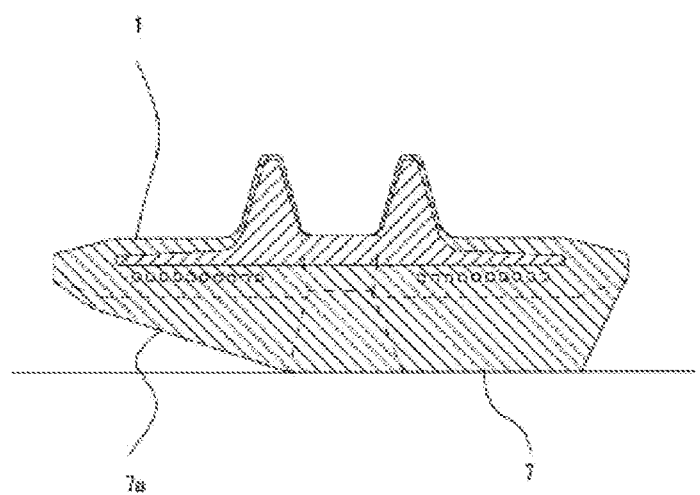
FIG. 10 shows the state of the elastic crawler when the elastic crawler related to the first embodiment of the invention travels on a flat surface.

Besides, the elastic crawler of the present embodiment enables stable travel on even a flat surface so that the other side portion in relation to the center position in the crawler width direction, which is not formed into the inclined surface, comes in contact with the flat surface as shown in FIG. 10, in moving on a normal flat surface, when the torpedo ladle rotates around the rotational axis during operation as shown in FIG. 5C, or in entering/leaving the torpedo ladle as shown in FIG. 5D. In these times, the inclined surface does not ground.

FIG. 2A is a cross section in the crawler width direction related to the second embodiment of the invention, showing an example wherein the inclined surface 7b of one side portion in relation to the center position L in the width direction of the crawler body is formed into a curved surface.

Further, according to the present embodiment, it is possible to more efficiently avoid the stress that the elastic crawler receives from the cylindrical wall surface, to reduce the wheel detachment and the edge cut, thereby enabling to improve the strength of the crawler body.

Furthermore, although the inclined surface 7a in the first embodiment has no lugs, the lugs may be provided. Each of FIG. 2B to FIG. 2D shows an elastic crawler in further embodiments wherein the lugs are provided on the inclined surface 7a. FIG. 2B is a Z-Z cross section taken along the lines Z-Z in FIG. 2D, FIG. 2C is a Y-Y cross section taken along the lines Y-Y in FIG. 2D, and FIG. 2D is a partially plan view of the ground-contact surface. Here, in recessed flat surfaces 2d and 2e interposed between the lugs 4a, left and right positions in relation to the center position L in the width direction of the crawler body may be preferably parallel to the faces 2a, and 2c and formed into a horizontal surface in the same plane. Besides, the inclined surface 7a of the lug 4a may be formed into the inclined surface 7b having a curved shape.

FIG. 3 is a cross section taken along the lines W-W in FIG. 3B in the crawler width direction related to the third embodiment of the invention, showing an example wherein the inclined surface 7c of one side portion in relation to the center position L in the width direction of the crawler body is formed into a core metal-less crawler. FIG. 3B is a plan view of the ground contact surface. In the present embodiment, although the inclined surface 7c is formed so as to have the lug 4b, it may be constructed so as to have no lugs. Besides, in FIGS. 2 and 3, elements which have the same constituents as FIG. 1 and do not require further explanation are denoted by the same reference signs.

Figure 11A:
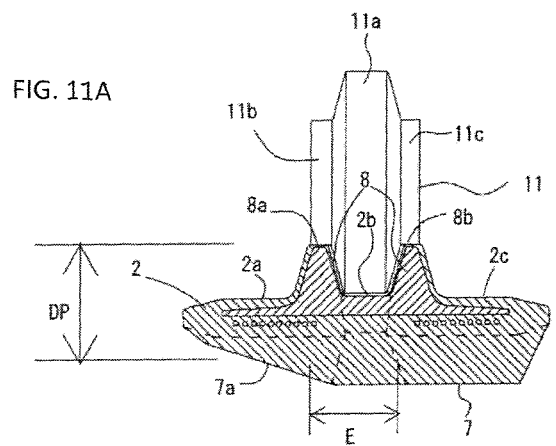
FIGS. 11A, 11B and 11C are views showing a settable range of a start position of the inclined surface.
Figure 11B:
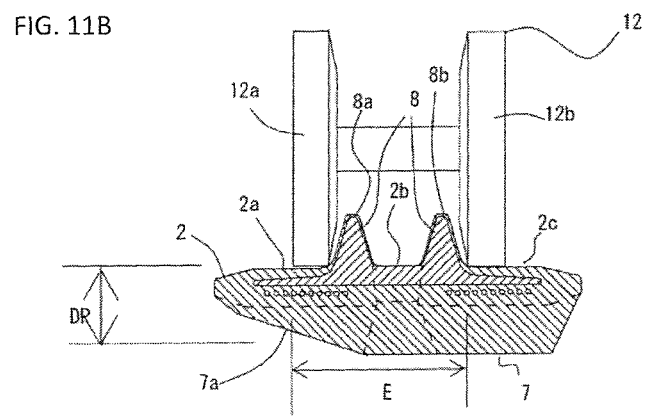
Figure 11C:
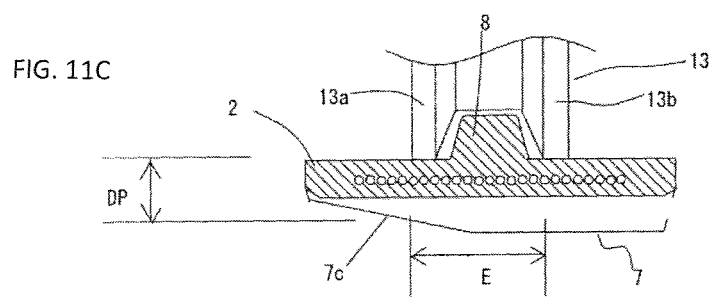

As for start positions of the inclined surfaces 7a, 7b and 7c, an acceptable range is determined by the positions of the tread surfaces of the roller wheels of the crawler-type travel device. The tread surface is a cylindrical surface of the roller wheel and treads on the elastic crawler. FIG. 11 presents the relationship therebetween, the right side of FIG. 11 is the inside of the crawler-type travel device, and the left side is the outside thereof. In FIGS. 11A and 11B, the roller wheels having different shapes are mounted on the same elastic crawler as shown in the first embodiment. In FIG. 11A, the roller wheel 11 includes a central tread surface 11a having a large diameter and left and right tread surfaces 11b and 11c each having a small diameter. The tread surfaces 11b and 11c ride up on the tops 8a and 8b of the right and left guide protrusions 8, and the tread surface 11a rides up on the face 2b. On the other hand, in FIG. 11B, the roller wheel 12 is constructed so that the tread surfaces 12a and the tread surface 12b are separated to right and left and ride up on the face 2a and the face 2b, respectively. Further, in FIG. 11C, which shows the core metal-less crawler of the third embodiment, the roller wheel 13 is constructed so that the tread surface 13a and the tread surface 13b are separated to right and left and ride up on the face 2a and the face 2c, respectively. An acceptable range E for the start positions of the inclined surfaces 7a and 7c in FIGS. 11A, 11B and 11C is in an area at the outer side than the inside tread surfaces of the roller wheels 11, 12 and 13 and at the inner side than the outside tread surfaces.

Although the ranges E of FIG. 11A and FIG. 11B are different in accordance with a difference of a shape of a roller wheel, the inclined surface 7a can start from the range E as shown in FIG. 11A so as to be commonly used for both of the roller wheels 11 and 12. Besides, the start position of the inclined surface 7b depicted in FIG. 2A conforms to the inclined surface 7a.

The inclined surfaces 7a, 7b and 7c reduce a distance dp gradually in a height direction with the face 2a or the top 8a. "Gradually reducing the distance dp" is equivalent to "gradually reducing a distance DP in the height direction with the tread surface 11a, 12a or 13a located outside the roller wheels. Because the tread surfaces 11a, 12a and 13a located outside the roller wheels ride up on the face 2a or the top 8a.

Figure 4:
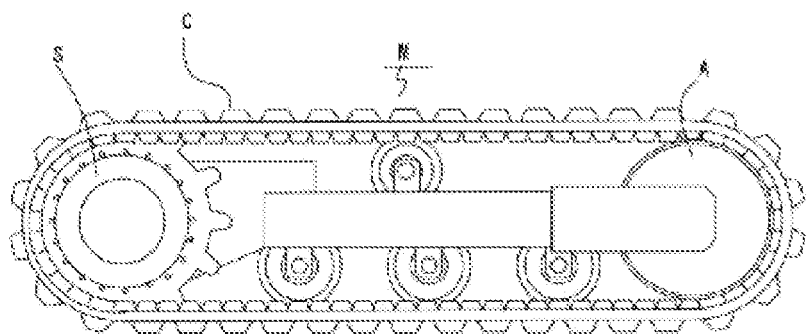
FIG. 4 shows an example of a crawler-type travel device which with an elastic crawler related to any of the some embodiments of the invention can be used.

FIG. 4 is a side view of a travel device M with elastic crawler C related to each embodiment of the invention. The travel device M is constructed so that a drive wheel S driven by a hydraulic motor and a driven wheel A are arranged apart fore and aft, a plurality of roller wheels are arranged between the drive wheel S and the driven wheel A, and then, the elastic crawler is wound on these drive wheel S, driven wheel A and roller wheels.

EXPLANATION OF REFERENCED NUMERALS

1 elastic crawler
2 crawler body
3 core metal
4 lug
5 engagement hole
6 steel cords
7a, 7b, 7c inclined surface
8 guide protrusion
11, 12, 13 roller wheel
11a, 11b, 11c, 12a, 12b, 13a, 13b tread surface
L center position in a crawler width direction
H virtual horizontal surface
M travel device
CM crawler-type travel device
S drive wheel
A driven wheel
C elastic crawler

The invention claimed is:

1. An elastic crawler comprising: a crawler body made of an endless elastic body depressed by roller wheels having left and right tread surfaces; and wherein the crawler body has opposing side portions and the opposing side portions are non-symmetrical with respect to an angle of inclination, one side portion of said opposing side portions having an inclined surface formed on the one side portion in relation to a center position in a crawler width direction on a ground-contact surface side of the crawler body toward a vicinity of one side end edge in the crawler width direction, wherein an inner portion of the inclined surface is disposed inwardly of an innermost portion of a horizontally extending surface configured to receive an outer wheel, wherein the inclined surface gradually reduces a crawler thickness with an outer tread surface by gradually reducing a distance in a height direction from a certain position within a certain extent ranging from an outer side of an inner tread surface of the roller wheels to an inner side of the outer tread surface, and wherein the inclined surface does not contact a ground when traveling on a flat surface and the one side portion of the crawler body does not contact the ground over an entire circumference when traveling on a flat surface.

2. The elastic crawler of claim 1, wherein the inclined surface formed on the one side portion in relation to the center position in the crawler width direction of the crawler body is formed in a curved surface.

3. A crawler-type travel device comprising: an elastic crawler having a crawler body made of an endless elastic body depressed by roller wheels having left and right tread surfaces; a plurality of lugs being disposed on a ground contact surface of the crawler body, wherein the crawler body has opposing side portions and the opposing side portions are non-symmetrical with respect to an angle of inclination, one side portion of said opposing side portions having an inclined surface formed on the one side portion in relation to a center position in a crawler width direction on a ground-contact surface side of the crawler body toward a vicinity of one side end edge in the crawler width direction, wherein an inner portion of the inclined surface is disposed inwardly of an innermost portion of a horizontally extending surface configured to receive an outer wheel, wherein the inclined surface gradually reduces a crawler thickness with an outer tread surface by gradually reducing a distance in a height direction from a certain position within a certain extent ranging from an outer side of an inner tread surface of the roller wheels to an inner side of the outer tread surface, wherein the inclined surface does not contact a ground when traveling on a flat surface and the one side portion of the crawler body does not contact the ground over an entire circumference when traveling on a flat surface, and the elastic crawler being mounted in a manner that the inclined surface formed on the one side portion in relation to the center position in the crawler width direction of the crawler body is located outside a vehicle body.

4. A crawler-type travel device comprising: an elastic crawler having a crawler body made of an endless elastic body depressed by roller wheels having left and right tread surfaces; a plurality of lugs being disposed on a ground contact surface of the crawler body, wherein the crawler body has opposing side portions and the opposing side portions are non-symmetrical with respect to an angle of inclination, one side portion of said opposing side portions having an inclined surface formed on the one side portion in relation to a center position in a crawler width direction on a ground-contact surface side of the crawler body toward a vicinity of one side end edge in the crawler width direction, wherein an inner portion of the inclined surface is disposed inwardly of an innermost portion of a horizontally extending surface configured to receive an outer wheel, wherein the inclined surface gradually reduces a crawler thickness with an outer tread surface by gradually reducing a distance in a height direction from a certain position within a certain extent ranging from an outer side of an inner tread surface of the roller wheels to an inner side of the outer tread surface, wherein the inclined surface does not contact a ground when traveling on a flat surface and the one side portion of the crawler body does not contact the ground over an entire circumference when traveling on a flat surface, wherein the inclined surface formed on the one side portion in relation to the center position in the crawler width direction of the crawler body is formed in a curved surface, and the elastic crawler being mounted in a manner that the inclined surface formed on the one side portion in relation to the center position in the crawler width direction of the crawler body is located outside a vehicle body.

* * * * *